Aug. 3, 1965 B. V. BHIMANI 3,199,023
METHOD AND APPARATUS FOR NONDESTRUCTIVELY TESTING
ELECTRICAL INSULATION BY SENSING LEVELS OF
IONIZATION OCCURRING IN THE INSULATION
Filed Nov. 27, 1959 4 Sheets-Sheet 1

Inventor:
Bhupendrakumar V. Bhimani,
by Paul A. Frank
His Attorney.

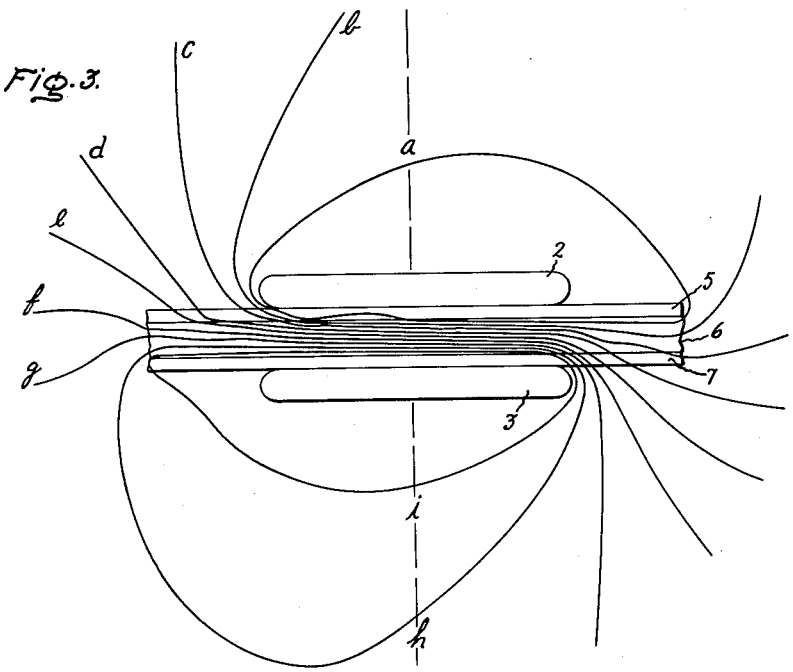
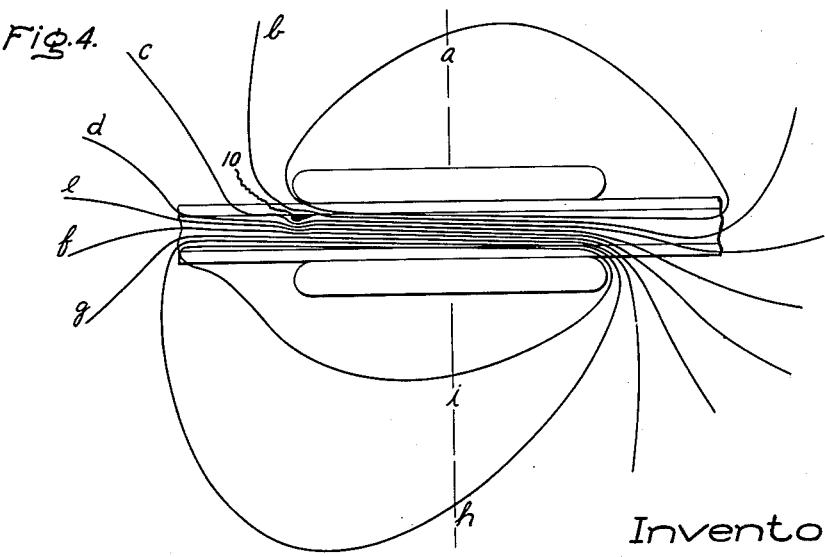

United States Patent Office 3,199,023
Patented Aug. 3, 1965

3,199,023
**METHOD AND APPARATUS FOR NONDESTRUC-
TIVELY TESTING ELECTRICAL INSULATION
BY SENSING LEVELS OF IONIZATION OCCUR-
RING IN THE INSULATION**
Bhupendrakumar V. Bhimani, Schenectady, N.Y., assignor to General Electric Company, a corporation of New York
Filed Nov. 27, 1959, Ser. No. 855,919
6 Claims. (Cl. 324—54)

This invention relates to a method and apparatus for testing electrical insulation and, more particularly, to a method and apparatus for performing direct current tests of insulation in large alternating current rotating equipment.

Manufacturers of large rotating alternating current equipment require tests of insulation during manufacture and upon installation of the equipment to detect defects therein. Utilities and others who use such equipment require tests to determine the existence of defects occurring during use and also to attempt to determine the useful life remaining in the insulation. Naturally, the efficacy of these tests is important but more important is the prerequisite that the test be absolutely non-destructive.

Since alternating current equipment is the subject of the test, the use of an alternating current is the most natural testing medium to duplicate operating conditions of the machine. However, it has been found that usually facilities to perform such tests are not readily available and under certain circumstances alternating current testing is not possible at all. On the other hand, direct current testing equipment does not present such problems since the equipment is both portable and also comparatively inexpensive. Because of these attractive features, great effort has been made to validate the efficacy of direct current tests of alternating current equipment. The greatest efforts have been made to correlate a relationship between leakage currents under direct current testing and potential insulation life. The results of these efforts have been inconclusive. However, tests using direct current are able to determine certain factors such as major insulation defects, short circuits, moisture content and the presence of conducting particles in the insulation.

One interesting phenomenon which has been noted, is that repeated leakage tests using direct current at the same voltage may result in insulation failure. This illustrates a potential destructive characteristic of a testing procedure which may make it unsuitable for use. A study of this last mentioned insulation failure has revealed that this type of failure is only characteristic of tests which use direct currents.

Composite insulations, it has been found, have capacitive and resistive characteristics which vary with the composite layers of the insulation. During the initial application of a unidirectional voltage, the voltage drop across each layer of insulation is determined by the capacitance characteristic of the material which constitutes each layer. After a suitable time interval the voltage drop across a layer changes since the circuit through the insulation layer becomes entirely resistive in nature. The charges previously collected through the capacitance effect discharge through the resistance of the insulation layer resulting in the charges collecting in the planes separating the composite layers. The presence of such charges, especially for prolonged periods, often initiates local binder evaporation and ionization. This ionization may culminate in the breakdown of the insulation. It has been found that alternating current during normal operation of the equipment will not cause the deposite of charges at the boundary layers of the insulation to effect such "interlayer ionization."

The chief object of the present invention is to provide an improved method and apparatus for performing non-destructive direct current tests of insulation.

Another object of the invention is to provide an improved apparatus for testing insulation with unidirectional current having means for detecting ionization occurring in the insulation and for terminating the tests in response to a predetermined amount of ionization.

A still further object is to provide an improved method for testing alternating current equipment with high voltage direct current without destroying the equipment.

These and other objects of my invention will become apparent from the following description.

Briefly stated, the present invention is directed to an apparatus for testing electrical insulation which applies a high unidirectional voltage across insulation to be tested, detects ionization occurring in the insulation, and interrupts the application of the voltage across the insulation in response to ionization detected above a predetermined value.

Another feature of the invention is a method for testing electrical insulation in which direct current is applied across the insulation, sensing ionization occurring in the insulation at a predetermined time interval after the voltage has been first applied and interrupting application of the voltage in the event that ionization above a predetermined level is sensed.

The attached drawings illustrate a preferred body of my invention, in which

FIGURE 3 is a sectional view of a piece of insulation showing the voltage distribution thereacross as distorted by non-uniform layer conductivities;

FIGURE 4 is a sectional view of a piece of insulation similar to that shown in FIGURE 3 indicating the effect of localized ionization on the voltage distribution;

Figure 1:
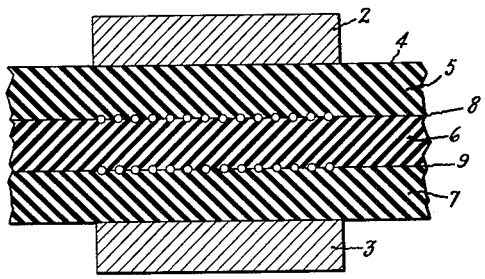
FIGURE 1 is a sectional view of a composite piece of insulation across which high voltage is applied.

In FIGURE 1 there are shown electrodes 2 and 3 which are adapted to impress a high unidirectional voltage across a section of composite insulation 4. The composite insulation comprises layers 5, 6 and 7 which are separated by the boundary layer portions 8 and 9. As previously mentioned during tests employing high unidirectional voltage there is a tendency for charged particles to migrate to these boundary layer portions 8 and 9 and in some instances this is accompanied by local binder evaporation which may be followed by ionization. At times the ionization reaches an equilibrium wherein no further damage occurs to the insulation. In other instances this ionization condition progressively worsens ultimately culminating in insulation breakdown.

Figure 2:
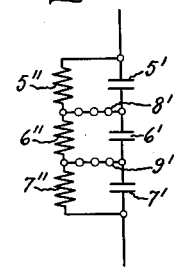
FIGURE 2 is a schematic showing of the equivalent electrical circuit created by passing current at high voltage through the insulation illustrated in FIGURE 1.

FIGURE 2 is a schematic equivalent circuit illustrating the action causing this type of failure of the insulation shown in FIGURE 1. Each layer of composite insulation 4 has resistive and capacitive characteristics. Very often these characteristics vary along a single piece of insulation and with every layer of the composite insulation. In FIGURE 2 layer 5 is shown having a capacitance 5' and a resistance 5". This equivalent resistance and capacitance are connected in parallel. Similarly, second and third layers 6 and 7 have capacitances 6' and 7' and resistances 6" and 7". Portions 8' and 9' constitute a construction equivalent to boundary portions 8 and 9 in FIGURE 1.

When a high unidirectional voltage is initially impressed across the insulation the composite insulation has a voltage drop across each layer of the insulation and this voltage drop is determined by the individual equivalent capacitance values 5', 6' and 7' of the individual layers. After these various capacitances have been charged and the circuit becomes resistive in nature, the values of voltage gradually change, the voltage drops being ultimately determined by the values of resistances 5", 6" and 7". At this point there is a tendency of the charges collected on capacitors 5', 6' and 7' to migrate from the capacitors across the various resistances 5", 6" and 7" and to congregate at the lines 8' and 9' which in the embodiment shown in FIGURE 1 constitutes the separating layers 8 and 9. After a predetermined length of time the concentration of electrical charges build up and attack the insulation causing the previously noted binder evaporation. Voids may be formed in the insulation at these points and the gases therein ionize. In some cases this ionization reaches an equilibrium status. In other cases, continuing destruction of the insulation occurs resulting in insulation failure.

FIGURES 3 and 4 illustrate the voltage distribution across a section of composite insulation. In FIGURE 3 there is no ionization occurring in the insulation. In FIGURE 4 ionization is taking place at point 10. The section of insulation shown in FIGURES 3 and 4 is similar to that shown in FIGURE 1. The voltage distribution is shown by equal voltage lines $a$ through $i$. In FIGURE 3 the lines are shown as being irregular, the result of the non-uniform layer conductivity of the insulation. In FIGURE 4 ionization which occurs at point 10 has caused the voltage distribution lines to reorient and in the area of the ionization these lines are substantially congested and eventually, if this ionization area increases, failure of the insulation will take place.

In FIGURES 1 through 4 insulation having three composite layers has been illustrated. It will be appreciated that similar phenomena occur in composite insulation having more or fewer layers. While electrodes have been shown for the sake of illustration, when rotating machinery having current carrying conductors is being tested, the conductors will comprise one electrode and the frame of the machine will comprise the other electrode.

Figure 5:
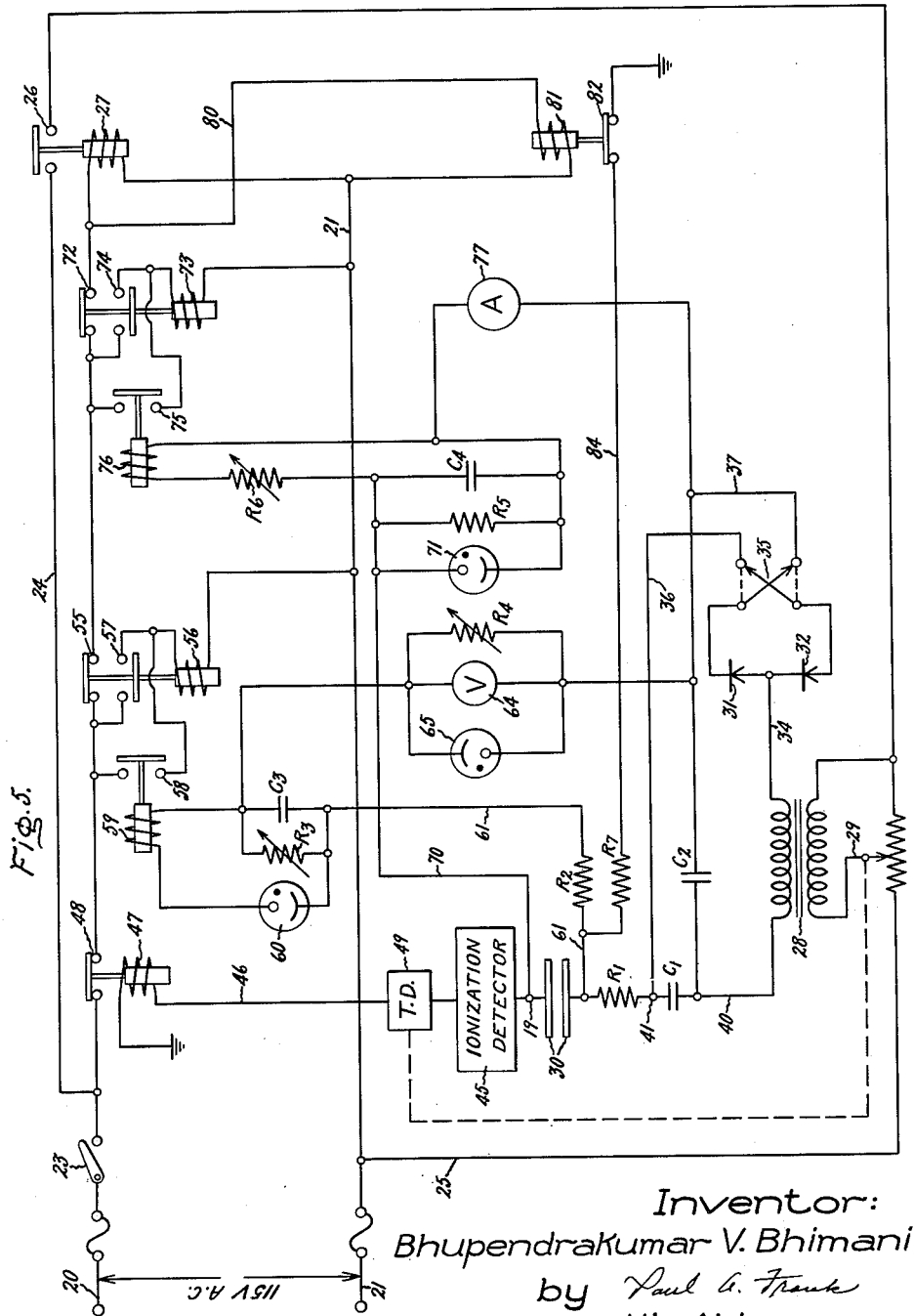
FIGURE 5 is a schematic circuit diagram of an apparatus for practicing the present invention.

FIGURE 5 illustrates a schematic circuit diagram of a preferred embodiment of an apparatus for practicing the present invention. The apparatus basically comprises means for impressing a high unidirectional voltage across probes 30, ionization detecting means, over-load sensing means, over-voltage sensing means and means for interrupting the application of the high voltage in response to ionization above a predetermined level, over-voltage or over-load. In this embodiment it is contemplated that a normal low voltage alternating current source may be utilized. This source voltage is impressed across lines 20 and 21. These lines may be suitably protected by fuses and line 20 is provided with a suitable control switch 23. Lines 20 and 21 are connected to a circuit for converting the alternating current to high voltage direct current and this circuit includes the lines 24 and 25 which have located therein the contacts 26. These contacts are opened upon de-energization on a relay coil 27 which is de-energized by either the detection of undesirable ionization, over-load or over-voltage.

The means for converting the alternating current to a high voltage direct current may take many forms. In the embodiment illustrated a transformer 28 is utilized whose output voltage may be varied either manually or by means of a motor operated contact which controls the magnitude of the voltage impressed on the primary winding of the transformer. This output varying means 29 may have associated therewith a suitable time delay mechanism 49, the function of which will be more fully described hereinafter. The output voltage of transformer 28 is supplied to leads 40 and 34. Lead 34 is connected to rectifying elements 31 and 32 which are connected to provide full wave rectification. The polarity of the rectifier output voltage supplied to lines 36 and 37 may be reversed by means of a switch 35. Line 37 is connected to line 40 through capacitor C2, and line 40 in turn is connected to point 41 through a capacitor C1 therein. Line 36 is also connected to point 41 thereby incorporating in the rectifying circuit a voltage doubling device. The high voltage at point 41 is supplied through resistor R1 to one of the test probes 30.

Figure 6:
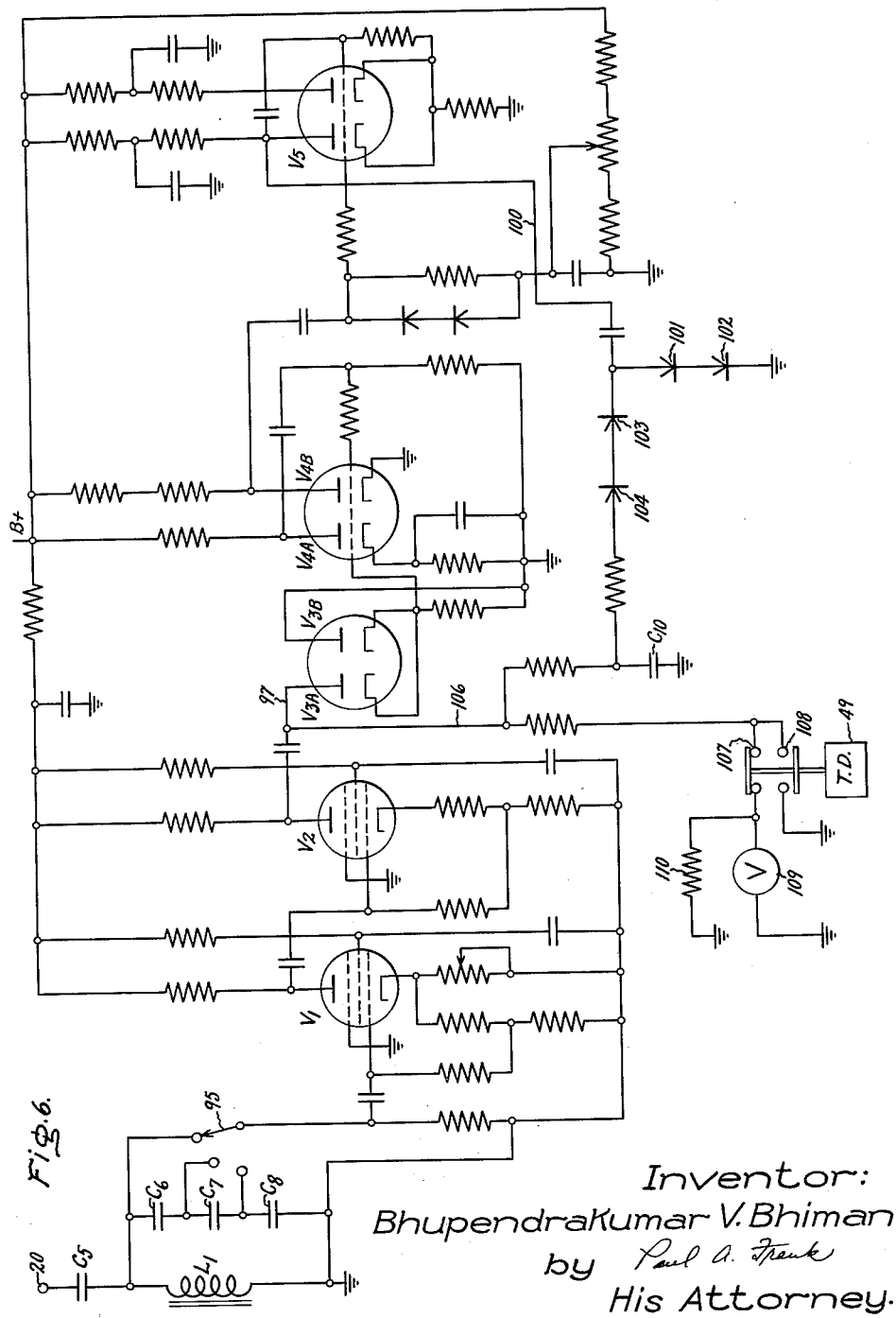
FIGURE 6 is a schematic circuit diagram of a preferred embodiment of an ionization detector for use in the apparatus shown in FIGURE 5.

The other or opposite of the probes 30 is connected to an ionization detector 45 which may take many forms, a preferred embodiment of which, however, is illustrated in FIGURE 6. Ionization detector 45 determines when ionization in the insulation has reached the predetermined value at which it is desirable that the direct current test be terminated. This is achieved by energizing the relay coil 47 through conductor 46 to open contacts 48 which will effect de-energization of relay coil 27 opening contacts 26 and terminate the application of voltage across probes 30. Conductor 46 is also connected to a suitable time delay mechanism 49 which is associated with transformer 28 through output varying means 29 in such a manner that varying the output voltage of transformer 28 delays the transmission of a signal over conductor 46 to relay coil 27. This construction is provided for a purpose to be more fully described hereinafter.

It is desirable under certain circumstances that the high voltage test be terminated in response to impressing of an excesive voltage on the insulation sample. To achieve this suitable means may be provided such as the circuit including conductor 61 which is connected R2 to a point between resistance R1 and the lower electrode 30. As illustrated resistance R2 is connected in series with the parallel circuits comprising neon lamp 60 and relay coil 59, variable resistance R3 and capacitor C3. These elements in turn are connected in series with the parallel circuits comprising voltmeter 64, variable resistance R4 and neon lamp 65. This parallel circuit in turn is connected to conductor 37 which as previously mentioned is associated with the rectifier circuit including switch 35 and rectifier elements 31 and 32.

In the event that an excessive voltage is generated in the D.C. circuit, the excessive voltage is operative through conductor 61 and neon lamp 60 to actuate coil 59 of the potential responsive relay having contacts 58. The response voltage of coil 59 may be varied by suitable adjustment of resistance R3. Capacitor C3 is provided to prevent voltage surges from adversely affecting the relay. This value of the voltage may be read on voltmeter 64 which is connected across variable resistance R4. Another neon lamp 65 is connected in parallel with voltmeter 64 to prevent the passing of a surge of current through the voltmeter. When an excessive voltage energizes coil 59 contacts 58 are closed thereby energizing coil 56 by completing a circuit between lines 20 and 21. Energizing relay coil 56 opens contacts 55 and closes contacts 57 thereby maintaining the energization of relay 56 which interrupts the flow current through relay coil 27 thereby opening contacts 26 and terminating the supply of voltage to the test specimen.

Means are also provided for interrupting the energization of coil 27 to open contacts 26 and thereby terminate the unidirectional voltage across the specimen in response to current over-loads. This is achieved in the present invention by conductor 70 connected between the upper probe 30 and the parallel circuit comprising neon lamp 71, resistance R5 and capacitance C4 connected in parallel with the circuit including variable resistance R6 which is connected in series with current responsive relay coil 76. These parallel circuits are connected in series with ammeter 77 which is connected to the previously mentioned line 37.

In the event that the current flowing through the test specimen becomes excessive, this over-load is sensed by current responsive relay coil 76 which closes contacts 75 thereby conecting relay coil 73 across lines 20 and 21. Energization of coil 73 opens contacts 72 and closes contacts 74 to maintain coil 73 in energized condition. Opening contacts 72 de-energizes coil 27 to interrupt the impressing of voltage across the test specimen. Neon lamp 71 connected in parallel with coil 76 and capacitance C4 are provided to reduce any surges in current. Ammeter 77 is provided to indicate the current passing through the circuit.

It will be appreciated that the over-voltage and over-load circuits may be suitably modified by polarity changing switches. If desired, the present instrumentation may utilize meters having center zero readings whereby both negative and positive polarities may be measured. Also if desired, the protective devices and the variable resistances provided for controlling the response of the relays, as illustrated, may be eliminated or other equivalent means substituted therefor.

In the event that relay coil 27 is de-energized to terminate the testing of the specimen in response to ionization, over-load or over-voltage, means may be provided to discharge the capacitors, which may have acquired a substantial electrical charge. In the present embodiment a relay coil 81 is connected in parallel with coil 27 whereby deenergization of coil 81 closes contacts 82. Contacts 82 provide a path from resistance R1 through resistance R7 to ground thereby discharging capacitors C1 and C2.

Generally, ionization occurring in insulation during a high voltage D.C. test manifests itself in the form of isolated pulses or surges of direct current. In detecting these surges it has been recognized that the surge or pulse caused by the inoization is a transient. Because of this transient characteristic the ionization signal may be filtered through a capacitor and suitably detected.

Means for detecting ionization currents incorporating a resonant circuit may be utilized. Referring to FIGURE 6 an ionization detecting circuit is illustrated which is connected at point 19 to the high voltage circut shown in FIGURE 5. The ionization current which is a transient flows through capacitance C5 which is connected to the resonant circuit comprising inductance L1 connected in parallel with capacitances C6, C7 and C8. A multi-contact switch 95 is provided so that the resonant frequency of the resonant circuit may be varied. By this means the degree of ionization desired to be sensed may be selected by manipulation of switch 95. The resonant frequency, for example, may be of a magnitude of 19 kilocycles.

It is appreciated that the signal from the resonant circuit is small and must be suitably amplified to be utilized further. The signal is therefore amplified through two stages of amplification shown as conventional stages V1 and V2. In a typical application such amplification circuits may provide a gain of 100. This amplified signal may be used to charge a large capacitor, for example, a 20 mfd. capacitor, and the voltage thereacross being read with a suitable voltmeter. In response to a predetermined voltage across the capacitor the voltmeter may cause energization of coil 47 whereby the relay opens contacts 48 to terminate the high voltage test.

It will be appreciated that the output of amplifier stages V1 and V2 does not provide a sufficient signal to charge a large capacitor. For this purpose, therefore, a peak voltmeter circuit may be provided. The signal from the output of tube V2 is supplied to the plate of rectifier tube V3. The first half of tube V3, namely V3a, is biased by a conventional negative feedback circuit which allows only the peaks of the output voltage to be supplied to the control electrode of amplifier V4. The second half of tube V3, namely V3b, acts as a clamping device on the control electrode of amplifier tube V4 so that there will be no voltage buildup on the control electrode of that tube. Since the output voltage of tube V4 is usually not of sufficient magnitude to charge a capacitor having a large value, further means are required to utilize the output signal from amplifier circuit V4. This may take the form of multi-vibrator stage V5. Rectifier tube V3a has served to clip the signal from the previous amplifier circuits. Stages V4 have amplified this signal. By passing the clipped signal to a multi-vibrator, a square wave is generated and supplied to conductor 100. The negative components of the square wave are eliminated through rectifiers 101 and 102 which are connected in series to ground. The positive components of the signal are passed through rectifiers 103 and 104 which are connected to capacitor C10 which comprises the large capacitor previously mentioned and which may have a value as great as 20 mfd. The potential on this capacitor is a source of negative bias for tube V3a, allowing the rectifier to conduct when the charge on the capacitor decreases. When a predetermined voltage builds up on the plates of capacitor C10 the signal passing to the plate of the rectifier is blocked. The voltage across capacitance C10 may be measured by voltmeter 109. This voltmeter may incorporate therein a suitable contact and circuit for energizing relay coil 47 shown in FIGURE 5 to terminate the D.C. test. The charge on capacitor C10 ultimately discharges through resistor 110 to ground.

It will be noted that contacts 107 and 108 are associated with voltmeter 109 in a manner that permits short circuiting the voltmeter. It will be noted that these contacts are controlled by time delay device 49 which is associated with the ionization detector shown in FIGURE 5. The purpose of this construction will be more fully described hereinafter.

Considering the operation of the circuit shown in FIGURE 6 when a predetermined amount of ionization occurs in a test specimen during the direct current test, the resonant circuit provides a signal which is suitably amplified and supplied to the peak reading voltmeter section of the circuit. Rectifier V3a supplies the peak portion only of such signals to amplifier stage V4. The signal is then supplied to multi-vibrator V5 which generates a square wave which, after rectification is supplied to capacitor C10. In response to a predetermined voltage across the capacitor, voltmeter 109 having suitable contacts closes a circuit which terminates the test.

Figure 7:
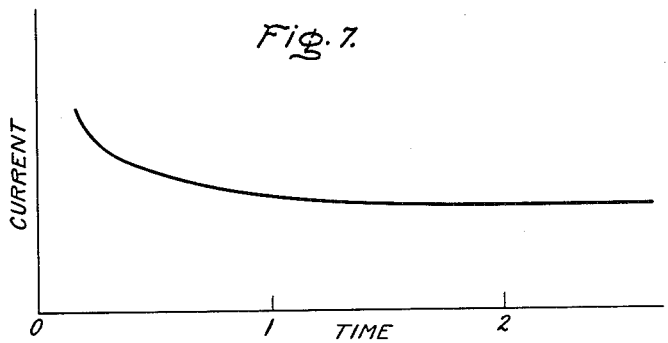
FIGURE 7 is a diagram plotting leakage current vs. time during test sequences.

FIGURE 7 shows a graph plotting current vs. time which illustrates the current characteristics when the direct current test is initiated at a fixed voltage. The current starts at a peak and the absorption current generally decreases until the plot of current vs. time becomes asymptotic. The magnitude of the current at this point is considered the leakage current and usually the time required to reach this condition is a function of the moisture content of the insulation. It has also been found that the curve of ionization vs. time follows a similar pattern, indicating that the detection of ionization for the purposes of terminating the test should be made after this equilibrium condition has been approached. Furthermore, the initial absorption currents have a surge-like nature which may be detected by the ionization detecting means and give a false ionization reading causing an unjustified early termination of the test.

Figure 8:
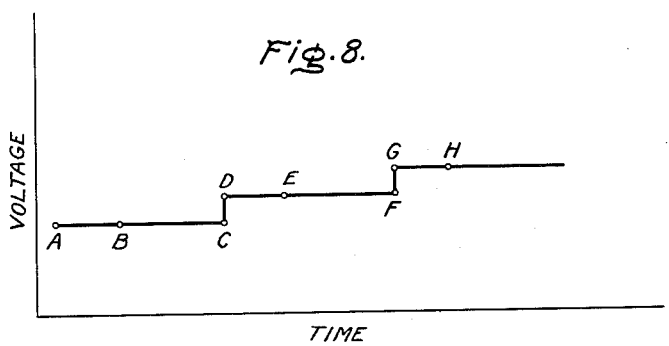
FIGURE 8 illustrates a diagram plotting voltage vs. time for testing insulation with the apparatus shown in FIGURE 5.

FIGURE 8 is a plot of voltage vs. time illustrating a method for conducting an insulation test for use with the apparatus shown in FIGURES 5 and 6. High unidirectional voltage is impressed at a constant potential across a test specimen at point A. At time B the leakage current may be detected; also it is desirous that dangerous ionization currents be detected. At time C the voltage is increased an increment to value D, the current stabilizes substantially at point E at which time ionization currents are again sensed. At point F the voltage is increased to level G and at time H ionization is again detected for the purpose of possibly terminating the test. This step-wise testing is conducted until the maximum voltage of the test is reached. In the event that harmful ionization is detected the test is terminated.

Referring to FIGURE 5, time delay mechanism 49, as previously noted provides a delay before the ionization detector may influence contacts 48. By adjusting variable output means 29 connected to the primary winding of transformer 28 a change in voltage output is obtained which actuates an interlock with time delay mechanism 49 creating a time interval before the ionization detector may terminate the test. The effect of time delay mechanism 49 is shown in FIGURE 6. During the new voltage condition of the initial portion of each test period, shown as the times between points A and B, D and E, G and H in FIGURE 8, it is not desirable to terminate the test in response to ionization readings. To achieve this, contacts 108 in FIGURE 6 are closed thereby grounding voltmeter 109 so that it has no effect on contacts 48 in FIGURE 5. After a predetermined time interval the time delay mechanism opens contacts 108 and closes contacts 107 permitting the ionization detector to influence the operation of the circuit in FIGURE 5.

Summarizing, the present invention provides an apparatus for applying various potentials of high voltage direct current across an insulation specimen. Means are provided to terminate the application of this voltage by sensing excessive voltages, excessive currents and after a predetermined time interval objectionable ionization currents, the latter being an indication of the existence of harmful levels of interlayer ionization in the insulation.

While I have described a preferred embodiment of my invention it will be understood that my invention is not limited thereto since it may be otherwise embodied within the scope of the appended claims.

What I claim ias new and desire to secure by Letters Patent of the United States is:

1. In a method of testing electrical insulation wherein an undesirable charge build-up occurs in the insulation due to the testing thereof, the steps which consist of applying a predetermined direct current voltage across the insulation, at some predetermined time interval after the voltage has been applied sensing a first level of ionization occuring in the insulation, and interrupting the application of the voltage prior to disruptive breakdown of the insulation being tested in the event that only ionization above a predetermined second level is sensed.

2. In a method of testing electrical insulation wherein an undesirable charge build-up occurs in the insulation due to the testing thereof, the steps which consist of applying a direct current voltage of a first value across the insulation, at some predetermined time interval after the first voltage value has been applied sensing a first level of ionization in the insulation, applying a direct current voltage of a second value across the insulation said second value voltage being greater than the first value, at some predetermined time interval after the second voltage has ben applied sensing a second level of ionization in the insulation, and interrupting the application of the first and second voltages prior to disruptive breakdown of the insulation being tested in the event that only ionization above a predetermined level is sensed.

3. In an apparatus for testing electrical insulation wherein an undesirable charge build-up occurs in the insulation due to the testing thereof, the combination of a source of high voltage direct current, means for applying the voltage across insulation to be tested, means adapted to detect a first level of ionization in the insulation, means for interrupting application of the voltage across the insulation prior to disruptive breakdown of the insulation in response to only ionization detected above a predetermined level, and time delay means connected to the means for interrupting the application of voltage across the insulation whereby the application of voltage is interrupted in response to a predetermined level of only ionization at some predetermined time interval after the voltage is applied.

4. In an apparatus for testing electrical insulation wherein an undesirable charge build-up occurs in the insulation due to the testing thereof, the combination of a source of high voltage direct current, means for applying the voltage across insulation to be tested, parallel resonant circuit means capacitively coupled to the means for applying a voltage across the insulation for detecting ionization in the insulation, said parallel resonance circuit means being energized by a predetermined first amount of ionization occurring in the insulation, and means for interrupting application of the voltage across the insulation in response to only ionization detected above a predetermined value.

5. In an apparatus for testing an electrical insulation wherein an undeisrable charge build-up occurs in the insulation due to the testing thereof, the combination of a source of high voltage direct current, a circuit for applying a high voltage across insulation to be tested, means for varying the voltage in the circuit, means adapted to detect a first level of ionization in the insulation, means for interrupting the application of the voltage across the insulation prior to disruptive breakdown of the insulation in response to the ionization detecting means sensing only ionization above a predetermined level, and time delay means connected to the voltage varying means to delay the operation of the interrupting means for a predetermined time interval after a voltage is first applied.

6. The apparatus according to claim 5 in which the ionization detecting means comprises parallel resonant circuit means capacitively coupled to the applied voltage circuit, said parallel resonant circuit means including selectively variable parallel resonating means which are energized by predetermined amounts of only ionization occurring in the insulation.

References Cited by the Examiner

UNITED STATES PATENTS

| 1,904,598 | 4/33 | Anderson | 324—54 |
| 2,087,783 | 7/37 | Savage | 324—54 |
| 2,310,335 | 2/43 | Wolfson | 324—54 X |
| 2,724,087 | 11/55 | Hand | 324—54 |
| 2,837,714 | 6/58 | Hill | 324—54 |
| 2,882,491 | 4/59 | Gooding | 324—54 |
| 2,920,270 | 1/60 | Saw | 324—54 |
| 2,932,791 | 4/60 | Carrington | 324—54 X |
| 3,005,150 | 10/61 | Behr | 324—54 |

FOREIGN PATENTS 574,067   4/59   Canada.

WALTER L. CARLSON, *Primary Examiner.*
SAMUEL BERNSTEIN, *Examiner.*